United States Patent
Kobayashi

(10) Patent No.: US 9,869,839 B2
(45) Date of Patent: Jan. 16, 2018

(54) OPTICAL ELEMENT HOLDING STRUCTURE, CAMERA FILTER FRAME, CAMERA FILTER UNIT, AND IMAGING LENS

(71) Applicant: KABUSHIKI KAISHA TSUSO, Nagano (JP)

(72) Inventor: Hideo Kobayashi, Nagano (JP)

(73) Assignee: KABUSHIKI KAISHA TSUSO, Nagano (JP)

( * ) Notice: Subject to any disclaimer, the term of this patent is extended or adjusted under 35 U.S.C. 154(b) by 0 days.

(21) Appl. No.: 14/917,259

(22) PCT Filed: Jul. 23, 2014

(86) PCT No.: PCT/JP2014/069445
§ 371 (c)(1),
(2) Date: Mar. 7, 2016

(87) PCT Pub. No.: WO2015/040952
PCT Pub. Date: Mar. 26, 2015

(65) Prior Publication Data
US 2016/0216474 A1    Jul. 28, 2016

(30) Foreign Application Priority Data

Sep. 18, 2013 (JP) .................................. 2013-193408

(51) Int. Cl.
*G02B 7/02* (2006.01)
*G02B 7/00* (2006.01)
(Continued)

(52) U.S. Cl.
CPC ............. *G02B 7/006* (2013.01); *G02B 7/023* (2013.01); *G02B 7/025* (2013.01); *G03B 11/00* (2013.01);
(Continued)

(58) Field of Classification Search
CPC . G02B 7/10; G02B 7/04; G02B 7/022; G02B 7/006; G02B 7/023; G02B 7/026
(Continued)

(56) References Cited

U.S. PATENT DOCUMENTS

| 2010/0111519 A1 | 5/2010 | Kobayashi |
| 2012/0147489 A1* | 6/2012 | Matsuoka .............. G02B 7/025 359/819 |

FOREIGN PATENT DOCUMENTS

| CN | 101738694 A | 6/2010 |
| JP | S50-025538 U | 3/1975 |

(Continued)

OTHER PUBLICATIONS

Japan Patent Office, Office Action for Japanese patent application No. 2016-142009, dated Nov. 15, 2016. Translation obtained from Global Dossier is attached hereto.
(Continued)

*Primary Examiner* — Mahidere Sahle

(57) ABSTRACT

A camera filter unit (1) includes an optical filter (2), a filter holding ring (3), and a filter frame (4) that are coaxially disposed in this order from the inside to the outside. The optical filter (2) has a tapered annular chamfered surface (13) on an outer peripheral edge of a rear filter surface (12). The filter holding ring (3) includes a front stopper (21) that is abuttable on the optical filter (2) from a front (X1) and a rear stopper (22) that extends along the annular chamfered surface (13). The filter frame (4) includes a second rear stopper (32) that prevents the optical filter (2) from moving to a rear (X2). The optical filter (2) is held by the filter holding ring (3) in a rotatable manner about an axis L. The optical filter (2) is fixed in a relatively unrotatable manner by the second rear stopper (32) abutting on the rear filter surface (12).

7 Claims, 10 Drawing Sheets

(51) Int. Cl.
*G03B 11/00* (2006.01)
*G03B 17/56* (2006.01)
*H04N 5/225* (2006.01)

(52) U.S. Cl.
CPC ......... *G03B 17/565* (2013.01); *G03B 17/566* (2013.01); *H04N 5/2254* (2013.01)

(58) Field of Classification Search
USPC .................................................. 359/811–830
See application file for complete search history.

(56) References Cited

FOREIGN PATENT DOCUMENTS

| | | |
|---|---|---|
| JP | S56-033630 A | 4/1981 |
| JP | H03-036940 A | 2/1991 |
| JP | H07-264448 A | 10/1995 |
| JP | H11-064700 A | 3/1999 |
| JP | 2002-005146 A | 1/2002 |
| JP | 2002-267915 A | 9/2002 |
| JP | 2002-323030 A | 11/2002 |
| JP | 2004264555 A1 * | 2/2003 |
| JP | 2004-264555 A | 9/2004 |
| JP | 2010-113016 A | 5/2010 |
| JP | 2010-197877 A | 9/2010 |

OTHER PUBLICATIONS

International Search Report for PCT/JP2014/069445, dated Oct. 28, 2014.

Written Opinion of the International Search Authority for PCT/JP2014/069445, dated Oct. 28, 2014.

Japan Patent Office, Office Action for Japanese patent application No. 2015-526793, dated Sep. 24, 2015, Translation obtained from Global Dossier is attached hereto.

Japan Patent Office, Office Action for Japanese patent application No. 2015-526793, dated Feb. 2, 2016, Translation obtained from Global Dossier is attached hereto.

Japan Patent Office, Office Action for Japanese patent application No. 2015-526793, dated May 24, 2016, Translation obtained from Global Dossier is attached hereto.

State Intellectual Property Office of the People's Republic of China, Office Action for Chinese patent application No. 201480049229.2, Sep. 6, 2017.

* cited by examiner

X(X1) ←————→ X(X2)

(a)

(b)

(a)

(b)

(a)

(b)

(a)

(b)

(a)

(b)

(a)

(b)

OPTICAL ELEMENT HOLDING STRUCTURE, CAMERA FILTER FRAME, CAMERA FILTER UNIT, AND IMAGING LENS

FIELD

The present invention relates to a holding structure for holding optical elements such as an optical filter and an optical lens with low stress. The present invention also relates to a camera filter frame and a camera filter unit that hold a filter with low stress, and an imaging lens that holds an optical lens with low stress.

BACKGROUND

A camera filter unit to be attached to a lens-barrel of an imaging lens is disclosed in the Patent Literature. The camera filter unit of the Patent Literature includes a discoid optical filter, a cylindrical filter holding ring into which the optical filter is fitted coaxially, a front stopper abutting on the optical filter from the front so as to prevent the optical filter from moving forward, and a rear stopper that prevents the optical filter from moving rearward. The front stopper is a protrusion that protrudes toward the inner peripheral side from the front end edge of the filter holding ring. The rear stopper is a swaged portion formed by swaging the rear end of the filter holding ring toward the inner peripheral side. The optical filter is gripped by the front stopper and the rear stopper.

CITATION LIST

Patent Literature

Japanese Patent Application Publication No. 2010-113016

SUMMARY

Technical Problem

If stress (pressure) placed on the optical filter by the front stopper and the rear stopper can be reduced, finer images and videos may be obtained when images and videos the resolution of which is many times higher than that of full high-definition ones are shot, for example.

An object of the present invention is to provide an optical element holding structure for holding an optical filter and an optical lens with low stress in view of the above. Another object of the present invention is to provide a camera filter frame and a camera filter unit that hold an optical filter with low stress. Still another object of the present invention is to provide an imaging lens that holds an optical lens with low stress.

Solution to Problem

To achieve the above object, an optical element holding structure of the present invention includes a cylindrical body into which an optical element is inserted coaxially on the inner peripheral side, a front stopper that is abuttable on the outer peripheral edge of the front surface of the optical element from the front in the axial direction, and a rear stopper that is abuttable on the outer peripheral edge of the rear surface of the optical element from the rear in the axial direction. In the optical element holding structure, the optical element is held between the front stopper and the rear stopper in a rotatable manner about the axis.

In the optical element holding structure of the present invention, the optical element is held between the front stopper and the rear stopper in a rotatable manner about the axis coaxially with the cylindrical body. The conventional optical element holding structure for gripping the optical element from the front and rear has a limitation in reducing stress placed on an optical filter by the front stopper and the rear stopper. In contrast to this, the present invention has a structure in which the optical element is not gripped, so that the stress placed on the optical filter can be reduced close to zero.

In the present invention, in order to hold the optical element in a rotatable manner about the axis, when the optical element is caused to abut on one of the front stopper and the rear stopper, a clearance is preferably formed between the optical element and the other of the front stopper and the rear stopper.

In the present invention, the clearance is preferably set at 0.05 mm or smaller. Managing the distance between the front stopper and the rear stopper with such accuracy of dimension can prevent the optical element from rattling.

In the present invention, the front stopper is a protrusion that protrudes from the front end of the cylindrical body to the inner peripheral side, and the rear stopper can be provided by bending the rear end of the cylindrical body toward the inner peripheral side. This structure facilitates holding the optical element between the front stopper and the rear stopper.

In the present invention, it is preferable that the cylindrical body includes an annular groove on at least one of the outer peripheral surface and the inner peripheral surface thereof, and that the rear stopper is provided by bending, toward the inner peripheral side, the portion in which the annular groove is formed in the cylindrical body. This structure only requires bending the portion of the cylindrical body that is made thin because of the annular groove being provided, in order to form the rear stopper, enabling bending processing to be performed with relatively weak force. As a result of this, the accuracy of the bending processing is improved, enabling the distance between the front stopper and the rear stopper to be managed accurately.

In the present invention, one of the front stopper and the rear stopper is formed integrally with the cylindrical body, and the other of the front stopper and the rear stopper is attached to the inner peripheral side of the cylindrical body. This structure facilitates holding the optical element between the front stopper and the rear stopper.

In the present invention, it is preferable that an adhesive is included that interposes between the cylindrical body and the optical element, and that the adhesive fixes the optical element to the cylindrical body in an unrotatable manner. This structure enables the optical element to be unrotatable without gripping the optical element from the front and rear direction.

In the present invention, in order to interpose the adhesive between the cylindrical body and the optical element, the cylindrical body includes a through hole that penetrates in a direction intersecting the axial direction, and the adhesive can enter between the cylindrical body and the optical element through the through hole.

In the present invention, a frame body is preferably included that holds the cylindrical body to the inner peripheral side. This structure enables the optical element such an optical filter held by the cylindrical body to be attached to a lens-barrel via the frame body. This structure also enables the optical element such as an optical lens held by the cylindrical body to be attached to an imaging device such as a camera and a projection device, for example, via the frame body.

In this case, the front stopper can be disposed in the cylindrical body, and the rear stopper can be disposed in the frame body. This structure facilitates holding the optical element between the front stopper and the rear stopper coaxially with the cylindrical body.

It is preferable that the front stopper is disposed at the front end of the cylindrical body, and that the rear end of the cylindrical body abuts on the rear stopper from the front. This structure enables the spacing between the front stopper disposed in the cylindrical body and the rear stopper disposed in the frame body to be defined accurately with the rear end of the cylindrical body abutting on the rear stopper. Consequently, the optical element can be held easily in a rotatable manner about the axis.

In the present invention, a second rear stopper can be included that abuts on the rear surface of the optical element to cause the optical element to be unrotatable, and the second rear stopper can be disposed on the frame body. The second stopper abuts on the optical element to cause the optical element to be unrotatable, and is not provided to grip the optical element between the second rear stopper and the front stopper. Consequently, stress (pressure) placed on the optical element by the second stopper can be nearly zero.

In this case, a frame-body side internal thread is formed in the area with a constant width on the inner peripheral surface of the frame body, from the front end edge thereof toward the rear, a cylindrical-body side external thread that can be threadedly engaged with the frame-body side internal thread is formed in the area with a smaller width than the formation area of the frame-body side internal thread, on the outer peripheral surface of the cylindrical body, from the front end edge thereof toward the rear, and the cylindrical body can be fixed to the frame body with the cylindrical-body side external thread screwed to a midway position of the frame-body side internal thread. When the cylindrical body holding the optical element is screwed in the frame body from the front in the axial direction by threadedly engaging the cylindrical-body side external thread with the frame-body side internal thread, this structure enables the screwing to be stopped once the rear surface of the optical element abuts on the second rear stopper (at a midway position of the frame-body side internal thread). Alternatively, this structure enables the screwing to be stopped once the cylindrical body is rotated in the screwing direction by a predetermined setting angle from the position at the time when the rear surface of the optical element abuts on the second rear stopper (at a midway position of the frame-body side internal thread). Thus, the stress (pressure) placed on the optical element by the second rear stopper can be controlled.

A camera filter frame according to the present invention includes the optical element holding structure, and holds an optical filter as the optical element.

With the camera filter frame according to the present invention, the optical filter can be held with low stress (pressure).

A camera filter unit according to the present invention includes the optical element holding structure and an optical filter held to the inner peripheral side of the cylindrical body.

With the camera filter unit according to the present invention, the stress (pressure) placed on the optical filter is low. Consequently, fine images and videos can be obtained even when the camera filter unit is mounted into an imaging lens to shoot images and videos in high resolution.

An imaging lens according to the present invention includes the optical element holding structure and an optical lens held to the inner peripheral side of the cylindrical body.

With the imaging lens according to the present invention, the stress (pressure) placed on the optical lens is low. Consequently, fine images and videos can be obtained when images and videos in high resolution are shot, for example.

DESCRIPTION OF EMBODIMENTS

The following describes a camera filter unit to which the present invention is applied with reference to the drawings.

First Embodiment (Entire Structure)

Figure 1:
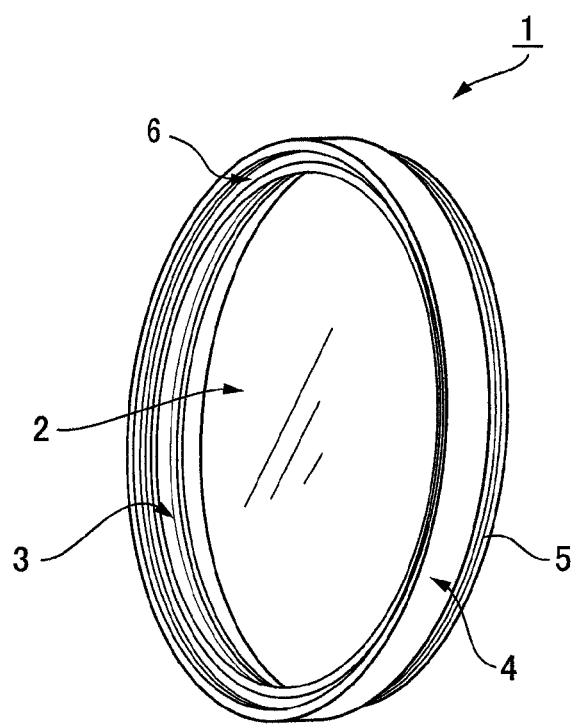
FIG. 1 is a perspective view of a camera filter unit according to a first embodiment.

FIG. 1 is a perspective view of a camera filter unit. As illustrated in FIG. 1, a camera filter unit 1 according to the present invention has an optical filter (optical element) 2, a cylindrical filter holding ring (cylindrical body) 3 into which the optical filter 2 is fitted coaxially, and a cylindrical filter frame (frame body) 4 that holds the filter holding ring 3 coaxially from the outer peripheral side. In the following description, the direction of an axis L of the filter holding ring and the filter frame 4 is a fore-and-aft direction X of the camera filter unit 1.

The optical filter 2 and the filter holding ring 3 are disposed without being exposed from the front and rear ends of the filter frame 4. A frame side external thread 5 is formed on a portion of constant width on the outer peripheral surface of the filter frame 4 from the rear end edge thereof toward a front X1. The frame side external thread 5 is a mounting portion for mounting the camera filter unit 1 into a lens-barrel of an imaging lens or a camera. In the present embodiment, the frame side external thread 5 has a pitch of 0.75 mm and is an external thread generally formed as a mounting portion. The filter holding ring 3 and the filter frame 4 are formed of a metal base and made of aluminum in the present embodiment. The filter holding ring 3 and the filter frame 4 constitute a camera filter frame 6 that holds the optical filter 2.

(Optical Filter)

FIG. 2(a) is a longitudinal sectional view schematically illustrating the camera filter unit 1. FIG. 2(b) is a partially enlarged sectional view in which the vicinity of the outer peripheral edge of the optical filter 2 is enlarged. As illustrated in FIG. 2(a), the optical filter 2 has a disc-like shape and includes a front filter surface 11 and a rear filter surface 12 orthogonal to the axis L. As illustrated in FIG. 2(b), to the outer peripheral edge of the rear filter surface 12, a tapered annular chamfered surface (tapered rear surface) 13 is continuous, inclining to the outer peripheral side toward the front X1. To the front end edge of the annular chamfered surface 13, an annular outer peripheral surface 14 is continuous, with a constant diameter dimension. To the front end edge of the annular outer peripheral surface 14, the front filter surface 11 is continuous. The annular chamfered surface 13 is one generally disposed on an optical filter. Note that the optical filter 2 includes a tapered annular chamfered surface inclining to the inner peripheral side toward the front X1 disposed between the annular outer peripheral surface 14 and the front filter surface 11 in some cases.

(Filter Holding Ring)

The filter holding ring 3 includes a front stopper 21 that protrudes to the inner peripheral side on the front end edge. The front stopper 21 is an annular protrusion. The annular front end surface of the front stopper 21 is an irregular reflection surface on which a plurality of grooves concentric with the filter holding ring 3 are formed. An annular rear end surface (rearward surface) 21a of the front stopper 21 is a flat surface orthogonal to the axis L. The front stopper 21 prevents the optical filter 2 from moving to the front X1 with the annular rear end surface 21a abutting on the outer peripheral edge of the front filter surface 11 of the optical filter 2 from the front X1.

The rear end of the filter holding ring 3 is a rear stopper 22 that extends along the annular chamfered surface 13. As illustrated in FIG. 2(b), the filter holding ring 3 includes an annular groove 23 on the outer peripheral surface of the part located outside in the radial direction of a corner 15 on the border between the annular chamfered surface 13 and the annular outer peripheral surface 14 of the optical filter 2. The rear stopper 22 is formed by bending the portion in which the annular groove 23 is disposed, along the corner 15 toward the inner peripheral side.

Figure 2:
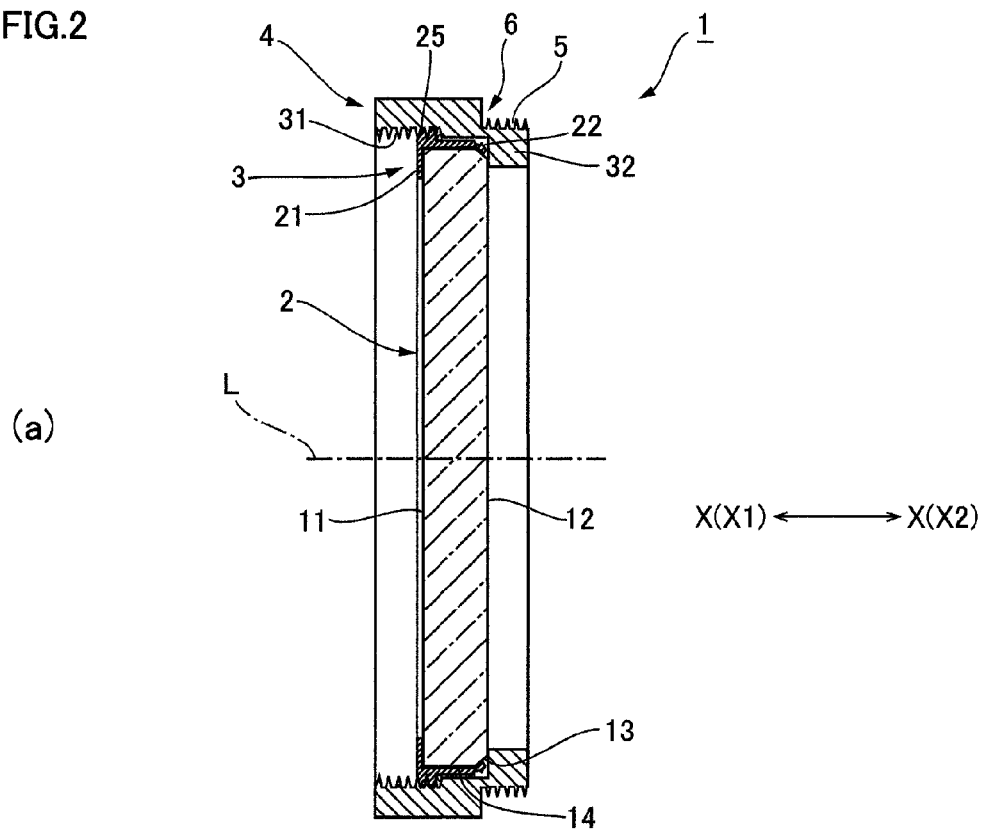
FIG. 2 is a longitudinal sectional view and a partially enlarged sectional view of the camera filter unit according to the first embodiment.
Figure 2:
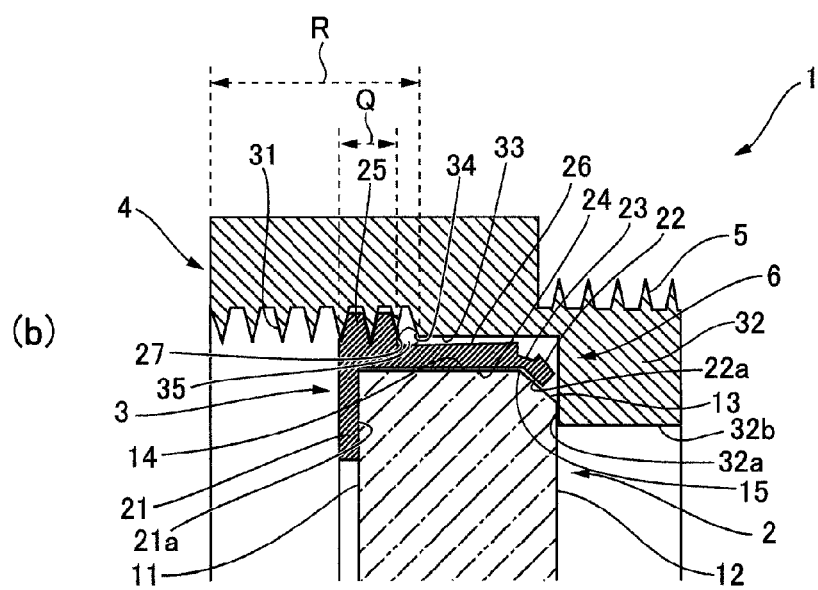

In the state illustrated in FIG. 2, or specifically, in the state where the camera filter unit is assembled, the annular rear end surface 21a of the front stopper 21 abuts on the entire outer peripheral edge of the front filter surface 11 of the optical filter 2. Meanwhile, the rear stopper 22 faces the annular chamfered surface 13 with an extra-narrow clearance of about 0.02 mm to 0.04 mm therebetween. The rear end of the rear stopper 22 is located midway along the annular chamfered surface 13. Specifically, the rear end of the filter holding ring 3 is located closer to the front X1 than the rear filter surface 12 of the optical filter 2 is.

A ring side annular inner peripheral surface 24 having a constant diameter is disposed in the part between the front stopper 21 and the rear stopper 22 in the filter holding ring 3. A clearance of uneven thickness of about 0.01 mm to 0.02 mm is present between the ring side annular inner peripheral surface 24 and the annular outer peripheral surface 14 of the optical filter 2.

A ring side external thread (cylindrical-body side external thread) 25 is formed in the area with a constant width on the outer peripheral surface of the filter holding ring 3, from the front end edge toward a rear X2. The ring side external thread 25 has a pitch of 0.75 mm. A ring side annular outer peripheral surface 26 that is smooth and has a constant diameter dimension is disposed between a formation area Q of the ring side external thread 25 and the annular groove 23 on the outer peripheral surface of the filter holding ring 3. The ring side annular outer peripheral surface 26 is located slightly closer to the inner peripheral side than the ring side external thread 25 is, and a ring side annular rearward surface 27 is disposed between the ring side annular outer peripheral surface 26 and the ring side external thread 25 to connect them.

(Filter Frame)

A frame side internal thread (frame-body side internal thread) 31 is formed in the area with a constant width on the inner peripheral surface of the filter frame 4, from the front end edge toward the rear X2. The ring side external thread 25 is threadedly engaged with the frame side internal thread 31, and the filter holding ring 3 is screwed in the filter frame 4 from the front X1. The width dimension of a formation area R of the frame side internal thread 31 is larger than the width dimension of the formation area Q of the ring side external thread 25. Thus, the front end of the frame side internal thread 31 is exposed with the filter holding ring 3 held by the filter frame 4 by the ring side external thread 25 being screwed in the frame side internal thread 31. The exposed front end of the frame side internal thread 31 is used as an attaching portion of a lens cap or a coupling portion for coupling other camera filter units. The frame side internal thread 31 has a pitch of 0.75 mm and is an internal thread generally formed as a mounting portion.

The filter frame 4 includes a second rear stopper 32 that protrudes to the inner peripheral side on the rear end. The second rear stopper 32 is an annular step and includes an annular front end surface 32a facing the front X1 and an annular inner peripheral surface 32b facing the inner peripheral side. The annular front end surface 32a is a flat surface orthogonal to the axis L and abuts, from the rear X2, on the rear filter surface 12 of the optical filter 2 held by the filter holding ring 3.

A frame side annular inner peripheral surface 33 having a constant diameter is disposed between the formation area R of the frame side internal thread 31 and the annular front end surface 32a on the inner peripheral surface of the filter frame 4. The frame side annular inner peripheral surface 33 is located slightly closer to the inner peripheral surface than the frame side internal thread 31 is, and a frame side annular forward surface 34 is disposed between the frame side annular inner peripheral surface 33 and the frame side internal thread 31 to connect them. The annular inner peripheral surface 32b extends parallel to the axis L. With the filter holding ring 3 held to the inner peripheral side of the filter frame 4, the frame side annular inner peripheral surface 33 faces the ring side annular outer peripheral surface 26 with a narrow spacing therebetween.

The filter holding ring 3 is in the state where the ring side external thread 25 thereof is screwed to a midway position of the frame side internal thread 31 of the filter frame 4. An adhesive 35 is interposed between the filter holding ring 3 and the filter frame 4 so that the filter holding ring 3 is fixed to the filter frame 4 in a relatively unrotatable manner. The adhesive 35 is interposed in at least one of the following points: between the frame side annular inner peripheral surface 33 and the ring side annular outer peripheral surface 26; between the frame side annular forward surface 34 and the ring side annular rearward surface 27; and between the frame side internal thread 31 and the ring side external thread 25.

(Assembly Method of Camera Filter Unit)

Figure 3:
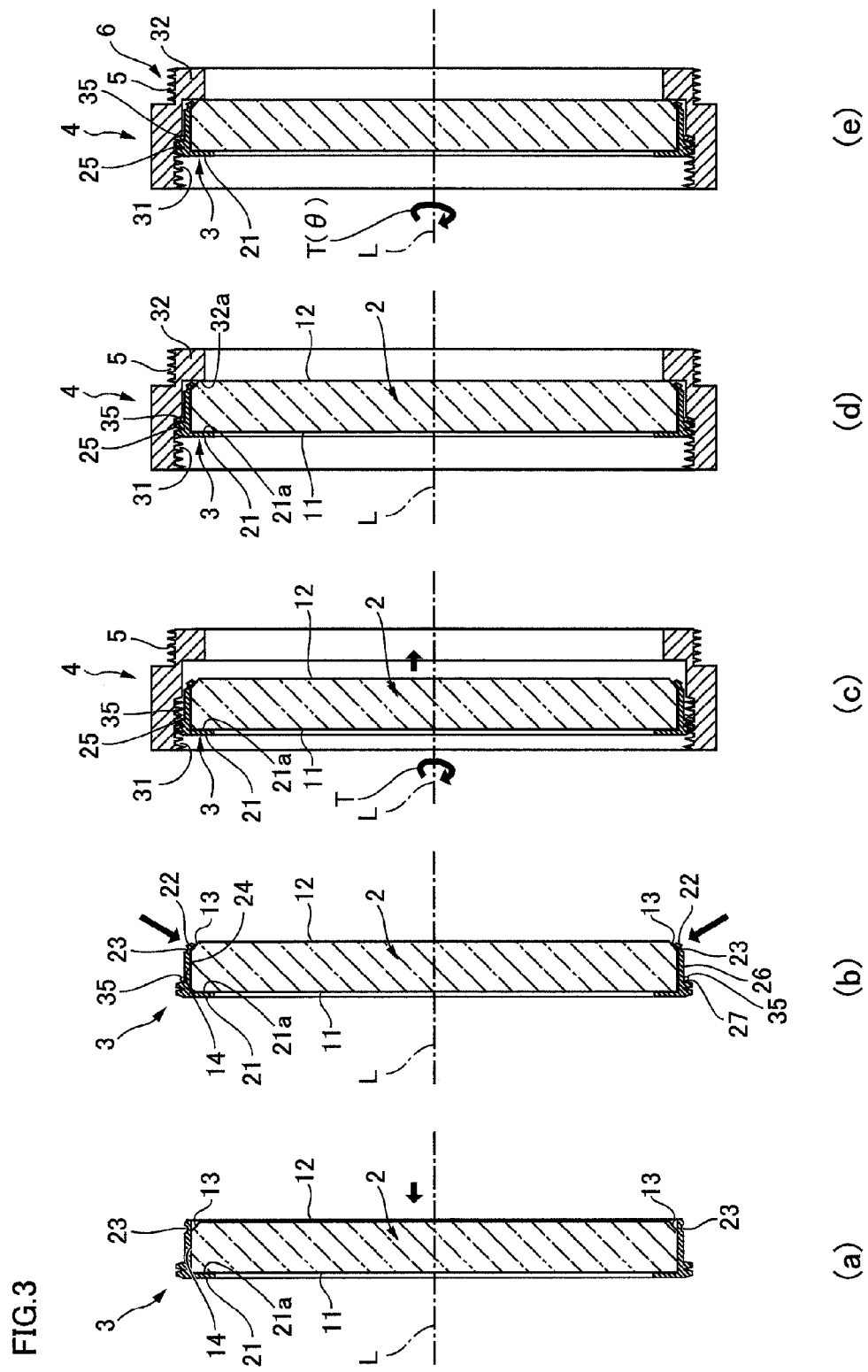
FIG. 3 is a diagram for describing an assembly method of the camera filter unit.

FIG. 3 is a diagram for describing an assembly method of the camera filter unit 1. As illustrated in FIG. 3(a), to manufacture the camera filter unit 1, the optical filter 2 is first fitted from the rear X2 into the cylindrical filter holding ring 3 without the rear stopper 22 disposed. Bending processing is then performed in which the part located outside in the radial direction of the corner 15 of the optical filter 2 is bent toward the inner peripheral side at the rear end of the filter holding ring 3. This processing enables the optical filter 2 to be held by the filter holding ring 3 in a relatively rotatable manner about the axis L.

In the bending processing, the rear end of the filter holding ring 3 is bent along the corner 15 of the optical filter 2 with the front filter surface 11 of the optical filter 2 abutting on the front stopper 21, as illustrated in FIG. 3(b). At this time, the portion in which the annular groove 23 is formed is located outside in the radial direction of the corner 15, and thus the filter holding ring 3 is bent toward the inner peripheral side from the portion in which the annular groove 23 is formed. The portion in which the annular groove 23 is formed is thinner than portions anterior and posterior thereto. The processing of bending the rear end of the filter holding ring 3 to form the rear stopper 22 along the annular chamfered surface 13 can thus be performed with relatively weak force, enabling stress placed on the optical filter 2 in the bending processing to be reduced. Additionally, the filter holding ring 3 can be bent with weak force, which improves the accuracy of the bending processing. Consequently, the optical filter 2 can be held by the filter holding ring 3 in a rotatable manner about the axis L while reducing the rattle caused by the rotation.

When the rear stopper 22 is formed, the optical filter 2 is fitted coaxially into the filter holding ring 3 to be held between the front stopper 21 and the rear stopper 22. The optical filter 2 in this state is rotatable about the axis L relative to the filter holding ring 3. Specifically, when the bending processing is complete, the optical filter 2 is held while abutting partially on the ring side annular inner peripheral surface 24 of the filter holding ring 3, and a clearance is formed partially between the annular outer peripheral surface 14 of the optical filter 2 and the ring side annular inner peripheral surface 24. When the optical filter 2 is put in a position perpendicular to the axis L, the following condition does not hold: the entire outer peripheral edge of the front filter surface 11 abuts on the front stopper 21, and the entire periphery of the annular chamfered surface 13 abuts on the rear stopper 22. Consequently, the optical filter 2 rotates relative to the filter holding ring 3.

In the present embodiment, a clearance of uneven thickness of about 0.01 mm to 0.02 mm is formed between the annular outer peripheral surface 14 of the optical filter 2 and the ring side annular inner peripheral surface 24 of the filter holding ring 3. When the optical filter 2 is disposed at a position spaced from both the front stopper 21 and the rear stopper 22, a clearance of about 0.01 mm to 0.02 mm is formed between the front filter surface 11 of the optical filter 2 and the front stopper 21 as well as between the annular chamfered surface 13 of the optical filter 2 and a tapered forward surface 22a of the rear stopper 22. For example, when the outer peripheral surface of the filter holding ring 3 is held by one hand and the optical filter 2 is held lightly between the thumb and index finger of the other hand from both sides in the direction of the axis L, the filter holding ring 3 and the optical filter 2 can thus be rotated relatively about the axis L with weak force. Because the optical filter 2 is held by the filter holding ring 3 in a relatively rotatable manner, the stress (pressure) placed on the optical filter 2 is nearly zero.

The adhesive 35 is then applied to the internal corner between the ring side annular outer peripheral surface 26 of the filter holding ring 3 and the ring side annular rearward surface 27. Subsequently, as illustrated in FIG. 3(c), the filter holding ring 3 is inserted into the filter frame 4, the ring side external thread 25 is threadedly engaged with the frame side internal thread 31, and the filter holding ring 3 is screwed in.

When the filter holding ring 3 is screwed in, the optical filter 2 is caused to abut on the front stopper 21 of the filter holding ring 3. Instead of screwing the ring side external thread 25 to the rear end of the frame side internal thread 31, the screwing is stopped once the rear filter surface 12 of the optical filter 2 abuts on the second rear stopper 32 of the filter frame 4, as illustrated in FIG. 3(d). This operation determines the position of the optical filter 2, preventing rattle of the optical filter 2. The optical filter 2 also becomes unrotatable relative to the filter holding ring 3.

Subsequently, as illustrated in FIG. 3(e), the filter holding ring 3 is rotated further in a screwing direction T by a predetermined setting angle θ. As a result, the optical filter 2 is subjected to slight force from the front stopper 21 and the second rear stopper 32.

Thereafter, the filter holding ring 3 and the filter frame 4 are left to stand until they are fixed to each other in a relatively unrotatable manner by curing of the adhesive 35. This completes the assembly of the camera filter unit 1.

In the present embodiment, the setting angle θ is set at 5°. The filter holding ring 3 is thus rotated in the screwing direction T by 5° from the angle position at the time when the rear filter surface 12 of the optical filter 2 abuts on the second rear stopper 32 of the filter frame 4, and then fixed to the filter frame 4. Because the frame side internal thread 31 has a pitch of 0.75 mm, screwing in the filter holding ring 3 by 5° causes the filter holding ring 3 to move on the filter frame 4 from the position at the time when the screwing is stopped to the rear X2 by approximately 0.01 mm. As a result, the optical filter 2 is subjected to slight force from the front stopper 21 and the second rear stopper 32, ensuring that the optical filter 2 is fixed.

Note that if the setting angle θ is set at 7° or smaller, when the filter holding ring 3 is rotated by the setting angle θ, the filter holding ring 3 is moved on the filter frame 4 by 0.015 mm or smaller, causing the front stopper 21 and the second rear stopper 32 to abut on the optical filter 2 with relatively weak force.

(Working Effect)

According to the present embodiment, the optical filter 2 is held by the filter holding ring 3 in a relatively rotatable manner about the axis L. Consequently, the stress (pressure) placed on the optical filter 2 being held by the filter holding ring 3 is nearly zero.

In the present embodiment, the front stopper 21 and the second rear stopper 32 are caused to abut on the optical filter 2 from the front and rear with slight force so that the optical filter 2 is fixed in a relatively unrotatable manner. Because the optical filter 2 is fitted coaxially into the filter holding ring 3 to be held between the front stopper 21 and the rear stopper 22, the optical filter 2 does not drop even if the optical filter 2 is not sandwiched between the front stopper 21 and the second rear stopper 32 with a force applied from the front and rear. Consequently, the optical filter 2 can be prevented from dropping simply by causing the front stopper 21 and the second rear stopper 32 to abut on the optical filter 2 with slight force, which enables stress placed on the optical filter 2 to be reduced.

Figure 4:
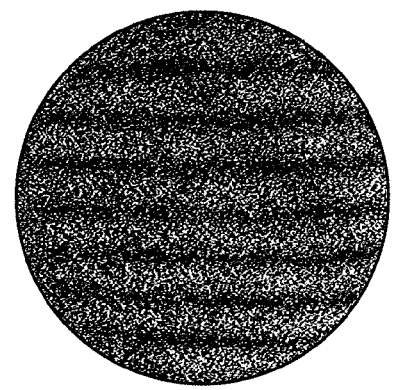
FIG. 4 is a diagram illustrating Newton's rings of an optical filter held by the camera filter frame and Newton's rings of the optical filter alone.
Figure 4:
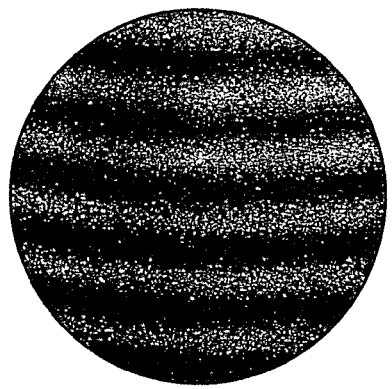

FIG. 4(a) is a diagram illustrating Newton's rings of the optical filter 2 in the camera filter unit 1 according to the present embodiment. FIG. 4(b) is a diagram illustrating Newton's rings of the optical filter 2 alone. As can be seen from FIG. 4, little difference is found between the Newton's rings of the optical filter 2 in the camera filter unit 1 according to the present embodiment and the Newton's rings of the optical filter 2 alone. Specifically, according to the present embodiment, little difference is found in profile irregularity of the optical filter 2 between when the optical filter 2 is held by the camera filter frame 6 and when the optical filter 2 is alone.

In the present embodiment, pressure at which the front stopper 21 and the second rear stopper 32 abut on the optical filter 2 can be adjusted by adjusting the amount of the filter holding ring 3 screwed in the filter frame 4. For example, setting the setting angle θ at a value smaller than 5° can further reduce the stress placed on the optical filter 2. Furthermore, the filter holding ring 3 and the filter frame 4 are fixed to each other by the adhesive 35 interposed therebetween with the relative positions thereof determined. Thus, after adjusting the amount of the filter holding ring 3 screwed in the filter frame 4, the distance between the front stopper 21 and the second rear stopper 32 does not change, nor does the stress placed on the optical filter 2 change.

In the present embodiment, because the rear end of the filter holding ring 3 (the rear end of the rear stopper 22) is located closer to the front X1 than the rear filter surface 12 is, the filter holding ring 3 and the second rear stopper 32 do not interfere with each other when the second rear stopper 32 is caused to abut on the optical filter 2. The second rear stopper 32 can thus be of simple shape like an annular step.

In the present embodiment, because the filter frame 4 is included that holds the filter holding ring 3 from the outer peripheral side, the second rear stopper 32 can be provided easily that abuts, from the rear X2, on the optical filter 2 held by the filter holding ring 3. Furthermore, because the filter frame 4 is included, a mounting portion for mounting the camera filter unit 1 into a lens-barrel of an imaging lens or a camera can be provided easily in the filter frame 4.

Modification of First Embodiment

Although the filter holding ring 3 includes the annular groove 23 in the above embodiment, the annular groove 23 can be omitted. Although the annular groove 23 is provided on the outer peripheral surface of the filter holding ring 3 in the above embodiment, the annular groove 23 may be provided in the part located outside in the radial direction of the corner 15 of the optical filter 2 on the inner peripheral surface of the filter holding ring 3. The annular groove 23 can also be provided both on the outer peripheral surface and the inner peripheral surface of the filter holding ring 3.

Although the rear end of the filter holding ring 3 (the rear end of the rear stopper 22) is located closer to the front X1 than the rear filter surface 12 of the optical filter 2 is in the above embodiment, the rear end of the filter holding ring 3 may protrude closer to the rear X2 than the rear filter surface 12 does. In this case, a recess is provided on the annular front end surface 32a of the second rear stopper 32, and the protruding rear end of the filter holding ring 3 is placed in the recess. This structure causes the second rear stopper 32 to abut on the rear filter surface 12 while avoiding interference between the second rear stopper 32 and the rear end of the filter holding ring 3.

Although the adhesive 35 is applied to the outer peripheral surface of the filter holding ring 3 when the filter holding ring 3 is screwed in the filter frame 4 in the above embodiment, an adhesive may be applied to the inner peripheral surface of the filter frame 4. In this case, the adhesive can be applied to the frame side annular inner peripheral surface 33 or the frame side annular forward surface 34.

The setting angle θ can be set at 0°. Specifically, once the rear filter surface 12 of the optical filter 2 abuts on the second rear stopper 32 of the filter frame 4, the filter holding ring 3 can be stopped from screwing in the filter frame 4 to fix the filter holding ring 3 and the filter frame 4 to each other.

An internal thread having a pitch of 0.5 mm or an internal thread having a pitch of 1 mm is provided as the frame side internal thread 31 in some cases. When an internal thread having a pitch of 0.5 mm is provided as the frame side internal thread 31, the setting angle θ can be set at 10° or smaller. When an internal thread having a pitch of 1 mm is provided as the frame side internal thread 31, the setting angle θ can be set at 5° or smaller. In this manner, when the filter holding ring 3 is rotated by the setting angle θ, the filter holding ring 3 is moved on the filter frame 4 by 0.015 mm or smaller, causing the front stopper 21 and the second rear stopper 32 to abut on the optical filter 2 with relatively weak force.

Second Embodiment

Figure 5:
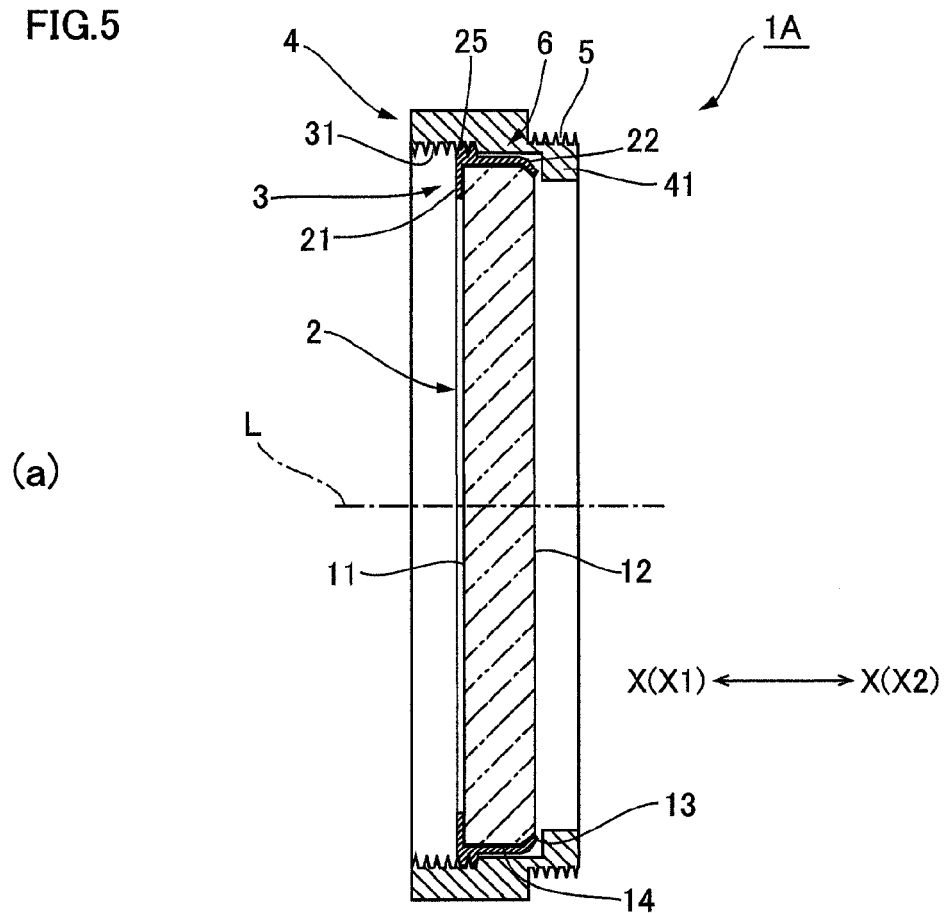
FIG. 5 is a longitudinal sectional view and a partially enlarged sectional view of a camera filter unit according to a second embodiment.
Figure 5:
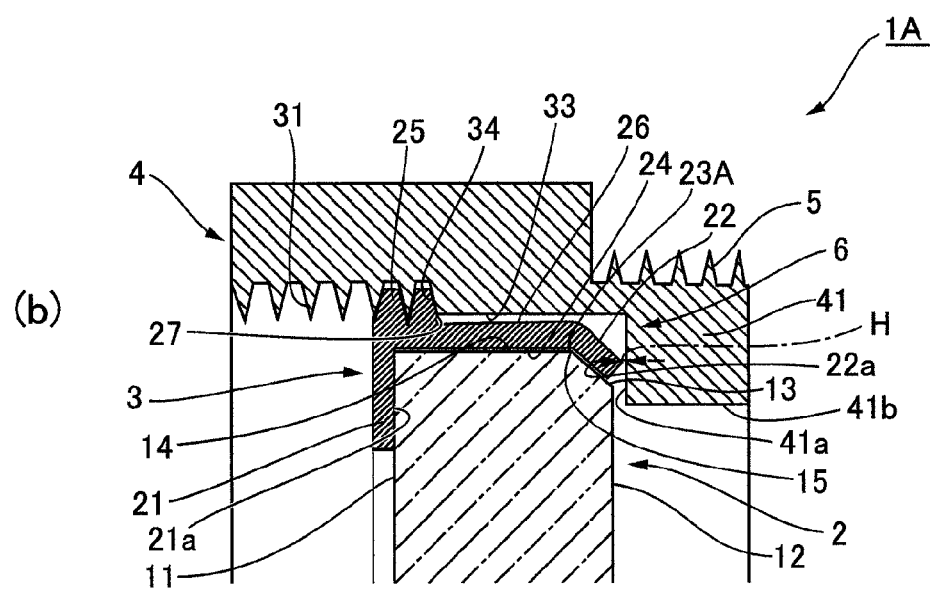

FIG. 5(a) is a longitudinal sectional view schematically illustrating a camera filter unit according to a second embodiment. FIG. 5(b) is a partially enlarged sectional view in which the vicinity of the outer peripheral edge of the optical filter 2 is enlarged in the camera filter unit according to the second embodiment. A camera filter unit 1A according to the present embodiment differs from the camera filter unit 1 according to the first embodiment in the position and the shape of an annular groove 23A. The camera filter unit 1A according to the present embodiment does not have the second rear stopper. Note that the camera filter unit 1A according to the present embodiment includes components similar to those of the camera filter unit 1 according to the first embodiment, and thus the same reference numerals are given to the corresponding components and description thereof will be omitted.

As illustrated in FIG. 5(a), the camera filter unit 1A according to the present embodiment has the optical filter 2, the filter holding ring (cylindrical body) 3 in which the optical filter 2 is fitted coaxially on the inner peripheral side, and the filter frame (frame body) 4 that holds the filter holding ring 3 coaxially from the outer peripheral side. The filter holding ring 3 and the filter frame 4 constitute the camera filter frame 6 that holds the optical filter 2.

The filter holding ring 3 includes the front stopper 21 that protrudes to the inner peripheral side on the front end edge. As illustrated in FIG. 5(b), the annular rear end surface (rearward surface) 21a of the front stopper 21 is a flat surface orthogonal to the axis L. The front stopper 21 is abuttable on the optical filter 2 from the front X1 and prevents the optical filter 2 from moving to the front X1. The rear end of the filter holding ring 3 is the rear stopper 22 that extends along the annular chamfered surface (tapered rear surface) 13 of the optical filter 2. The rear stopper 22 is abuttable on the optical filter 2 from the rear X2 and prevents the optical filter 2 from moving to the rear X2.

The filter frame 4 includes a rear protrusion 41 at the rear end. The rear protrusion 41 is an annular protrusion that protrudes from the filter frame 4 to the inner peripheral side at a constant height, and includes an annular front end surface 41a facing the front X1 and an annular inner peripheral surface 41b facing the inner peripheral side. The annular inner peripheral surface 41b is located closer to the inner peripheral side than the annular chamfered surface 13 of the optical filter 2 is. The annular front end surface 41a is a flat surface orthogonal to the axis L and extends in the direction orthogonal to the axis L.

The filter holding ring 3 is screwed in the filter frame 4 until the ring side annular rearward surface 27 continuous to the rear of the ring side external thread 25 abuts on the frame side annular forward surface 34 of the filter frame 4, and fixed to the filter frame 4. The adhesive 35 can be used to fix the filter holding ring 3 to the filter frame 4.

While the filter holding ring 3 is held by the filter frame 4, a clearance is formed between the annular front end surface 41a of the rear protrusion 41 and the rear filter surface 12 of the optical filter 2. Specifically, the rear protrusion 41 of the filter frame 4 and the optical filter 2 do not abut on each other. When the camera filter unit 1A is seen from the rear X2 in the direction of the axis L, the rear protrusion 41 overlaps the rear stopper 22, which hides the rear stopper 22. A clearance H is formed between the rear end of the rear stopper 22 and the annular front end surface 41a of the rear protrusion 41. The clearance H is 0.02 mm or smaller.

Figure 6:
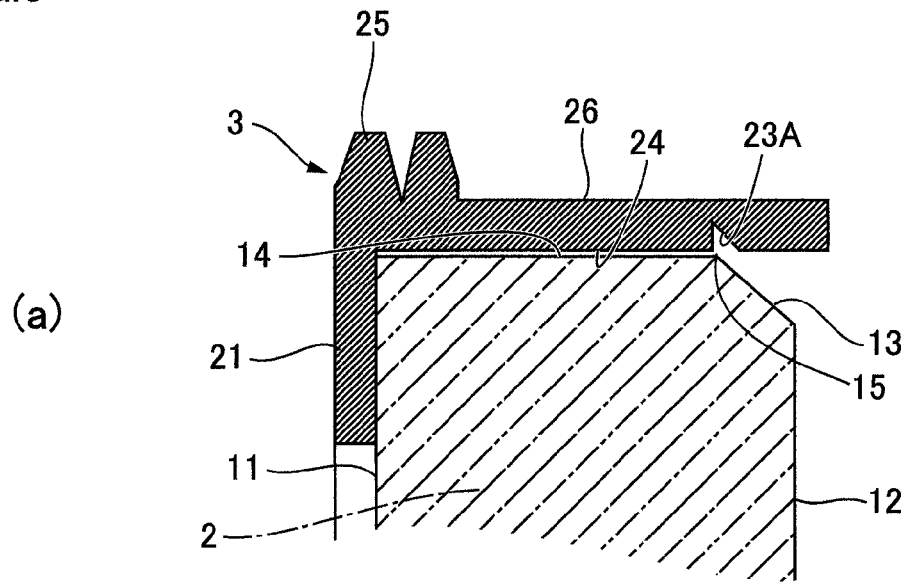
FIG. 6 is a diagram for describing bending processing in which a rear stopper is formed.
Figure 6:
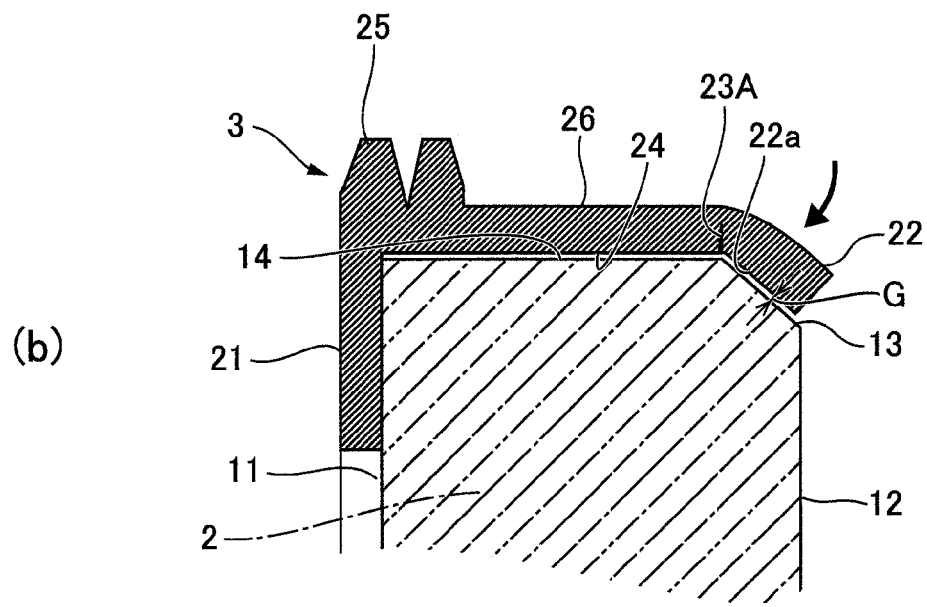

The following describes a formation method of the rear stopper 22 according to the present embodiment with reference to FIG. 6. FIG. 6 is a diagram for describing the formation method of the rear stopper 22. As illustrated in FIG. 6(a), in the state before the rear stopper 22 is disposed, the rear end of the filter holding ring 3 extends parallel to the annular outer peripheral surface 14 of the optical filter 2. The filter holding ring 3 includes the annular groove 23A on the inner peripheral surface thereof. The annular groove 23A is disposed in a portion located outside in the radial direction of the corner 15 on the border between the annular chamfered surface 13 and the annular outer peripheral surface 14 of the optical filter 2. The annular groove 23A indicates a triangular sectional shape tapering toward the outer peripheral side when the filter holding ring 3 is cut by a plane including the axis L. The annular groove 23A is defined by an annular rearward surface orthogonal to the axis L and a tapered surface inclining from the end of the outer peripheral side of the rearward surface to the inner peripheral side toward the rear.

As illustrated in FIG. 6(b), the rear stopper 22 is formed by bending the portion in which the annular groove 23A is disposed in the filter holding ring 3, toward the inner peripheral side. More specifically, the rear stopper 22 is disposed by bending the rear end of the filter holding ring 3 toward the inner peripheral side until the annular groove 23A is closed (until the space in the groove of triangular sectional shape disappears). The vertex angle of the triangle, which is the bottom of the annular groove 23A, is a given angle corresponding to the inclination angle of the annular chamfered surface 13 of the optical filter 2. Thus, when the rear end of the filter holding ring 3 is bent toward the inner peripheral side until the annular groove 23A is closed, the forward surface of the rear stopper 22 becomes a tapered surface along the annular chamfered surface 13.

While the optical filter 2 is held between the front stopper 21 and the rear stopper 22, the optical filter 2 is rotatable about the axis L relative to the filter holding ring 3. Specifically, a clearance of uneven thickness of about 0.01 mm to 0.02 mm is formed between the annular outer peripheral surface 14 of the optical filter 2 and the ring side annular inner peripheral surface 24 of the filter holding ring 3. When the front filter surface 11 of the optical filter 2 is caused to abut on the front stopper 21, a clearance G of 0.03 mm or smaller is formed between the annular chamfered surface 13 of the rear filter surface 12 of the optical filter 2 and the tapered forward surface 22a of the rear stopper 22.

(Working Effect)

According to the present embodiment, the optical filter 2 is held by the filter holding ring 3 in a relatively rotatable manner about the axis L. Consequently, the stress (pressure) placed on the optical filter 2 being held by the filter holding ring 3 is nearly zero.

The camera filter unit 1A according to the present embodiment does not include the second rear stopper that abuts on the optical filter 2 from the rear. In the present embodiment, however, the clearance G between the optical filter 2 and the forward surface 22a of the rear stopper 22 is 0.03 mm or smaller, which is narrow. The optical filter 2 is thus maintained in the state of being held coaxially with the filter holding ring 3, without rattling between the front stopper 21 and the rear stopper 22. Note that the optical filter 2 held by the camera filter frame 6 does not rattle as long as the clearance G is set at 0.05 mm or smaller. Consequently, the camera filter unit 1A is adequate for practical use when mounted into a lens-barrel and installed in a camera.

In the present embodiment, because the filter frame 4 is included that holds the filter holding ring 3 from the outer peripheral side, a mounting portion for mounting the camera filter unit 1A into a lens-barrel of an imaging lens or a camera can be provided in the filter frame 4.

In the present embodiment, the rear protrusion 41 disposed in the filter frame 4 protrudes to the inner peripheral side more than the rear stopper 22 does to cover the rear stopper 22 from the rear X2 in the direction of the axis L. The rear protrusion 41 can thus protect the rear stopper 22. In the present embodiment, the clearance H between the rear end of the rear stopper 22 and the annular front end surface 41a of the rear protrusion 41 is set at 0.02 mm or smaller. When the rear stopper 22 formed through the processing of bending the rear end of the filter holding ring 3 to the inner peripheral side is caused to deform to the outer peripheral side, the rear end of the rear stopper 22 and the rear protrusion 41 interfere with each other. Specifically, the filter frame 4 includes an interference portion (the rear protrusion 41) that interferes with the rear stopper 22 displaced to the outer peripheral side so as to prevent the rear stopper 22 from deforming to the outer peripheral side. The optical filter 2 is thus maintained in the state of being held coaxially with the filter holding ring 3.

Note that when the optical filter 2 is caused to abut on the front stopper 21, the annular chamfered surface 13 of the optical filter 2 and the forward surface 22a of the rear stopper 22 may come in partial contact with each other. Specifically, when the filter holding ring 3 is swaged to the inner peripheral side to form the rear stopper 22, part of the forward surface 22a of the rear stopper 22 may be in contact with the annular chamfered surface 13. Also in this case, when the outer peripheral surface of the filter holding ring 3 is held by one hand and the optical filter 2 is held lightly between the thumb and index finger of the other hand from both sides in the direction of the axis L, the stress (pressure)

placed on the optical filter 2 is nearly zero as long as the filter holding ring 3 and the optical filter 2 can be rotated relatively about the axis L with weak force.

The rear stopper 22 can also be disposed such that the forward surface 22a thereof is an annular surface along the outer peripheral edge of the rear filter surface 12 of the optical filter 2. Specifically, when the rear stopper 22 is formed, the forward surface 22a thereof may be formed to be a flat surface orthogonal to the axis L by bending the rear end of the rear stopper 22 into a right angle to the inner peripheral side, so that the rear stopper 22 (forward surface 22a) is abuttable on the rear filter surface 12 from the rear. Also in this case, if the clearance G between the optical filter 2 and the forward surface 22a of the rear stopper 22 is set at 0.05 mm or smaller that is formed when the optical filter 2 is caused to abut on the front stopper 21, the optical filter 2 can be held coaxially by the filter holding ring 3 in a rotatable manner In this case, the annular groove 23A formed on the inner peripheral surface of the filter holding ring 3 can also have a rectangular sectional shape.

Modification of Second Embodiment

Figure 7:
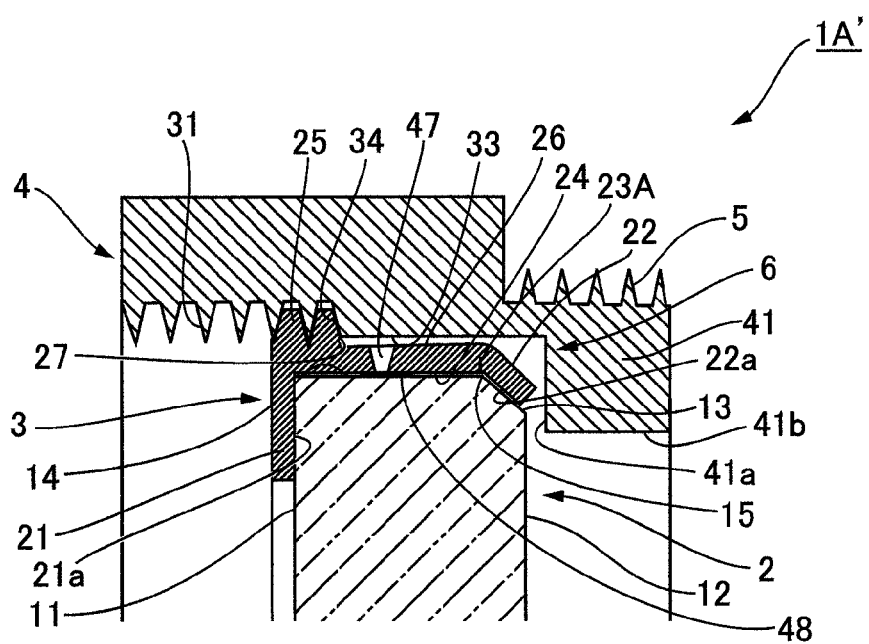
FIG. 7 is a partially enlarged sectional view of a camera filter unit according to a modification of the second embodiment.

FIG. 7 is a partially enlarged sectional view in which the vicinity of the outer peripheral edge of the optical filter 2 is enlarged in a camera filter unit according to a modification of the second embodiment. Note that a camera filter unit 1A' according to the modification includes components similar to those of the camera filter unit 1A according to the second embodiment, and thus the same reference numerals are given to the corresponding components and description thereof will be omitted.

The camera filter unit 1A' according to the present modification includes adhesive injection holes (through holes) 47 that penetrate in the direction orthogonal to the axis L in the filter holding ring 3, as illustrated in FIG. 7. Each of the adhesive injection holes 47 includes a tapered inner peripheral surface the inner diameter dimension of which decreases from the outer peripheral side toward the inner peripheral side. Three adhesive injection holes 47 are disposed at equal angular intervals. The camera filter unit 1A' according to the present modification also includes an adhesive 48 interposed between the annular outer peripheral surface 14 of the optical filter 2 and the ring side annular inner peripheral surface 24 of the filter holding ring 3. The adhesive 48 enters between the filter holding ring 3 and the optical filter 2 through the adhesive injection holes 47. The optical filter 2 is in the state where the outer peripheral edge of the front filter surface 11 abuts on the annular rear end surface (rearward surface) 21a of the front stopper 21. The adhesive 48 fixes the optical filter 2 abutting on the front stopper 21 to the filter holding ring 3 in an unrotatable manner.

According to the present modification, the working effect similar to the camera filter unit 1A according to the second embodiment can be obtained. Additionally, rotation of the optical filter 2 about the axis L can be prevented according to the present modification. Furthermore, the optical filter 2 can be determined accurately to be in the position to abut on the front stopper 21 and can maintain the position, according to the present modification.

Note that the number of the adhesive injection holes 47 disposed in the filter holding ring 3 may be one, two, or four and more in the camera filter unit 1A' according to the modification.

Third Embodiment

Figure 8:
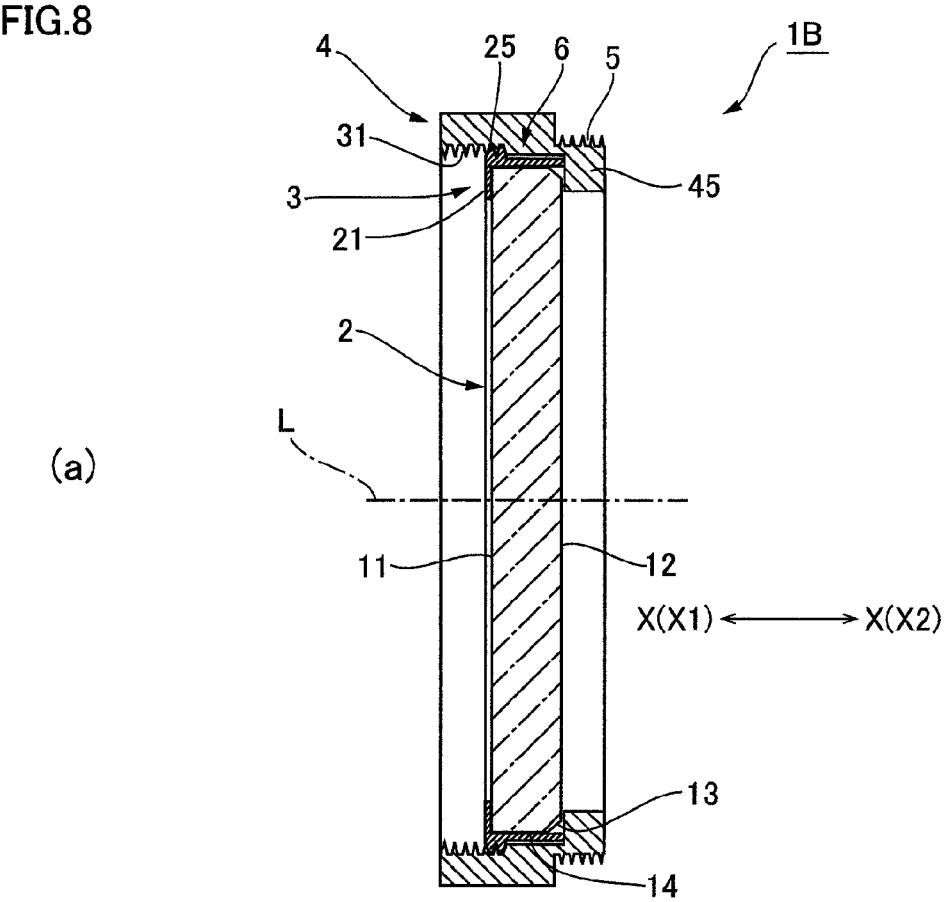
FIG. 8 is a longitudinal sectional view and a partially enlarged sectional view of a camera filter unit according to a third embodiment.
Figure 8:
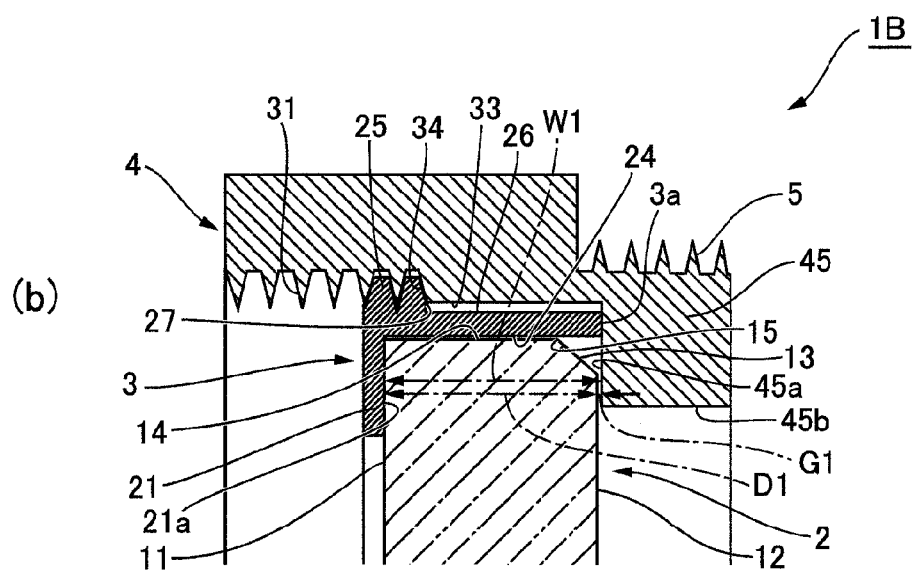

FIG. 8(a) is a longitudinal sectional view schematically illustrating a camera filter unit according to a third embodiment. FIG. 8(b) is a partially enlarged sectional view in which the vicinity of the outer peripheral edge of the optical filter 2 is enlarged in the camera filter unit according to the third embodiment. In a camera filter unit 1B according to the present embodiment, a rear stopper 45 that prevents the optical filter 2 from moving to the rear X2 is disposed in the filter frame 4. Note that the camera filter unit 1B according to the present embodiment includes components similar to those of the camera filter unit 1 according to the first embodiment, and thus the same reference numerals are given to the corresponding components and description thereof will be omitted.

As illustrated in FIG. 8(a), the camera filter unit 1B according to the present invention has the optical filter 2, the filter holding ring 3 (cylindrical body) 3 in which the optical filter 2 is fitted coaxially on the inner peripheral side, and the filter frame 4 (frame body) 4 that holds the filter holding ring 3 coaxially from the outer peripheral side. The filter holding ring 3 and the filter frame 4 constitute the camera filter frame 6 that holds the optical filter 2.

The filter holding ring 3 includes the front stopper 21 that protrudes to the inner peripheral side on the front end edge. The annular rear end surface (rearward surface) 21a of the front stopper 21 is a flat surface orthogonal to the axis L. The front stopper 21 is abuttable on the optical filter 2 from the front X1 and prevents the optical filter 2 from moving to the front X1. The rear of the filter holding ring 3 extends parallel to the annular outer peripheral surface 14 of the optical filter 2. Specifically, the rear of the filter holding ring 3 has a constant diameter dimension. In the filter holding ring 3, the ring side annular inner peripheral surface 24 that extends from the front stopper 21 to the rear X2 has a width dimension W1 larger than a thickness dimension D1 of the optical filter 2. In the present embodiment, the difference between the width dimension W1 of the ring side annular inner peripheral surface 24 and the thickness dimension D1 of the optical filter 2 is 0.03 mm or smaller. A clearance of uneven thickness of about 0.01 mm to 0.02 mm is formed between the annular outer peripheral surface 14 of the optical filter 2 that is fitted in the inner peripheral side of the filter holding ring 3 and the ring side annular inner peripheral surface 24 of the filter holding ring 3.

The filter frame 4 includes the rear stopper 45 at the rear end. The rear stopper 45 is an annular protrusion that protrudes from the filter frame 4 to the inner peripheral side at a constant height, and includes an annular front end surface (forward surface) 45a facing the front X1 and an annular inner peripheral surface 45b facing the inner peripheral side. The annular inner peripheral surface 45b of the rear stopper 45 is located closer to the inner peripheral side than the annular chamfered surface 13 of the optical filter 2 is. The annular front end surface 45a is a flat surface orthogonal to the axis L and extends along the rear filter surface 12 of the optical filter 2. When seen from the rear X2 in the direction of the axis L, the rear stopper 45 overlaps the annular chamfered surface 13 and the outer peripheral edge of the rear filter surface 12, which is the outer peripheral edge of the rear surface of the optical filter 2. The rear stopper 45 is abuttable on the optical filter 2 (outer peripheral edge of the rear filter surface 12) from the rear X2 and prevents the optical filter 2 from moving to the rear X2.

The filter holding ring 3 is screwed in the filter frame 4 until a rear end 3a of the filter holding ring 3 abuts on the forward surface of the rear stopper 45 disposed on the filter frame 4, and fixed to the filter frame 4. The adhesive 35 can also be used to fix the filter holding ring 3 to the filter frame 4.

While the filter holding ring 3 is fixed to the filter frame 4, the ring side annular rearward surface 27 continuous to the rear of the ring side external thread 25 abuts on the frame side annular forward surface 34 of the filter frame 4. While the filter holding ring 3 is fixed to the filter frame 4, the optical filter 2 is rotatable about the axis L between the front stopper 21 and the rear stopper 45 of the filter frame 4. Specifically, a clearance of uneven thickness of about 0.01 mm to 0.02 mm is formed between the annular outer peripheral surface 14 of the optical filter 2 and the ring side annular inner peripheral surface 24 of the filter holding ring 3. When the front filter surface 11 of the optical filter 2 is caused to abut on the front stopper 21, a clearance G1 of 0.03 mm or smaller is formed between the rear filter surface 12 of the optical filter 2 and the annular front end surface 45a of the rear stopper 45.

(Working Effect)

According to the present embodiment, the optical filter 2 is held by the camera filter frame 6 in a relatively rotatable manner about the axis L. Consequently, the stress (pressure) placed on the optical filter 2 being held by the camera filter frame 6 is nearly zero.

In the present embodiment, when the optical filter 2 is caused to abut on the front stopper 21, the clearance G between the optical filter 2 and the forward surface 22a of the rear stopper 22 is 0.05 mm or smaller, which is narrow. Furthermore, the rear end 3a of the filter holding ring 3 in which the front stopper 21 is formed abuts on the annular front end surface 45a of the rear stopper 45, whereby the dimension between the front stopper 21 and the rear stopper 45 is defined accurately. The optical filter 2 is thus maintained in the state of being held coaxially with the filter holding ring 3, without rattling between the front stopper 21 and the rear stopper 22.

In the present embodiment, because the filter frame 4 is included that holds the filter holding ring 3 from the outer peripheral side, a mounting portion for mounting the camera filter unit 1B into a lens-barrel of an imaging lens or a camera is provided easily in the filter frame 4.

Similarly to the camera filter unit 1A' according to the modification of the second embodiment, the adhesive injection holes (through holes) 47 can be disposed in the filter holding ring 3 so as to interpose the adhesive 48 between the filter holding ring 3 and the optical filter 2 through the adhesive injection holes 47, also in the present embodiment. In this manner, rotation of the optical filter 2 about the axis L can be prevented. The optical filter 2 can also be determined accurately to be in the position in which the outer peripheral edge of the front filter surface 11 of the optical filter 2 abuts on the annular rear end surface 21a of the front stopper 21, and can maintain the position.

Fourth Embodiment

Figure 9:
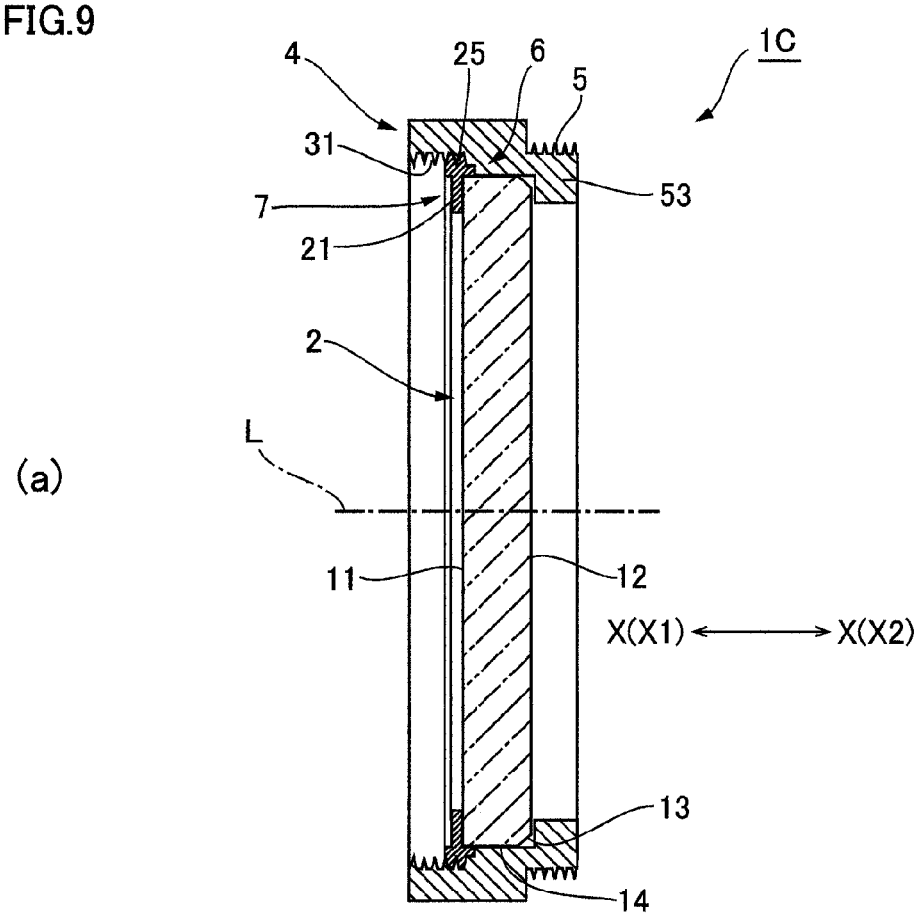
FIG. 9 is a longitudinal sectional view and a partially enlarged sectional view of a camera filter unit according to a fourth embodiment.
Figure 9:
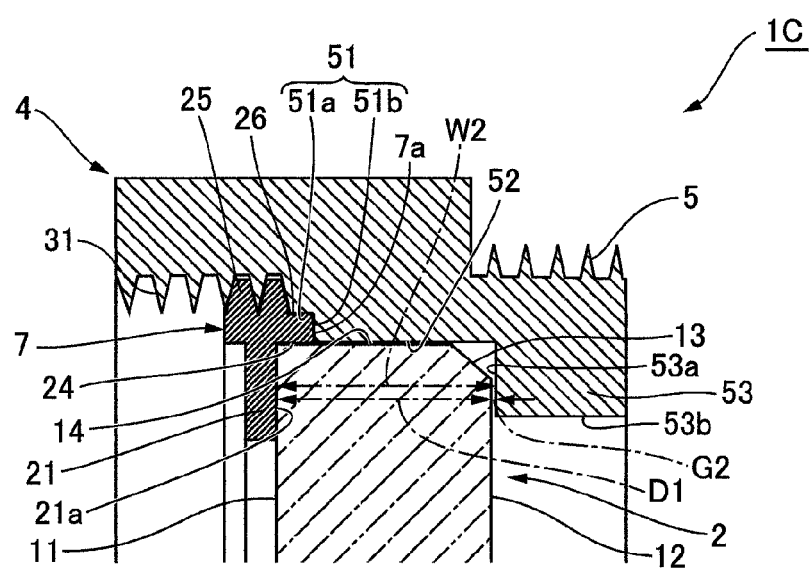

FIG. 9(a) is a longitudinal sectional view schematically illustrating a camera filter unit according to a fourth embodiment. FIG. 9(b) is a partially enlarged sectional view in which the vicinity of the outer peripheral edge of the optical filter 2 is enlarged in the camera filter unit according to the fourth embodiment. A camera filter unit 1C according to the present embodiment does not include the filter holding ring 3, and the optical filter 2 is held by the filter frame (cylindrical body) 4. Note that the camera filter unit 1C according to the present embodiment includes components corresponding to those of the camera filter unit 1 according to the first embodiment, and thus the same reference numerals are given to the corresponding components and description thereof will be omitted.

As illustrated in FIG. 9(a), the camera filter unit 1C according to the present invention has the optical filter 2, the filter frame 4 in which the optical filter 2 is fitted coaxially on the inner peripheral side, and a stop ring 7 that is attached to the inner peripheral side of the filter frame 4. The filter frame 4 and the stop ring 7 constitute the camera filter frame 6.

As illustrated in FIG. 9(b), the filter frame 4 includes, on the inner peripheral side thereof, the frame side internal thread 31, an annular step 51, an optical filter holding surface 52, and a rear stopper 53, from the front X1 toward the rear X2. The frame side internal thread 31 is formed in the area with a constant width, from the front end edge of the filter frame 4 toward the rear X2. The annular step 51 includes an annular inward surface 51a that extends with a constant diameter dimension from the frame side internal thread 31 toward the rear X2, and an annular forward surface 51b that extends from the rear end of the annular inward surface 51a toward the inner peripheral side in the radial direction (direction orthogonal to the axis L). The optical filter holding surface 52 is an annular surface facing the inner peripheral side, and extends with a constant diameter dimension from the end of the inner peripheral side of the annular forward surface 51b toward the rear X2. The optical filter 2 is fitted in the inner peripheral side of the optical filter holding surface 52 and held coaxially by the filter frame 4. A clearance of uneven thickness of about 0.01 mm to 0.02 mm is present between the optical filter holding surface 52 and the annular outer peripheral surface 14 of the optical filter 2.

The rear stopper 53 is an annular protrusion that protrudes from the rear end of the filter frame 4 to the inner peripheral side at a constant height. The rear stopper 53 includes an annular front end surface (forward surface) 53a facing the front X1 and an annular inner peripheral surface 53b facing the inner peripheral side. The annular inner peripheral surface 53b of the rear stopper 53 is located closer to the inner peripheral side than the annular chamfered surface 13 of the optical filter 2 is. The annular front end surface 53a is a flat surface orthogonal to the axis L and extends along the rear filter surface 12 of the optical filter 2. When seen from the rear X2 in the direction of the axis L, the rear stopper 53 overlaps the annular chamfered surface 13 and the outer peripheral edge of the rear filter surface 12, which is the outer peripheral edge of the rear surface of the optical filter 2. The rear stopper 45 is abuttable on the optical filter 2 (outer peripheral edge of the rear filter surface 12) from the rear X2 and prevents the optical filter 2 from moving to the rear X2.

The stop ring 7 includes the front stopper 21 that protrudes to the inner peripheral side on the inner peripheral surface thereof. The front stopper 21 is an annular protrusion. The annular rear end surface (rearward surface) 21a of the front stopper 21 is a flat surface orthogonal to the axis L. The front stopper 21 is abuttable on the optical filter 2 from the front X1 and prevents the optical filter 2 from moving to the front X1. The stop ring 7 also includes the ring side annular inner peripheral surface 24 that extends from the end on the outer peripheral side of the annular rear end surface 21a of the front stopper 21 to the rear X2. The ring side annular inner peripheral surface 24 has the same inner diameter dimension as that of the optical filter holding surface 52.

The ring side external thread 25 is formed in the area with a constant width on the outer peripheral surface of the stop ring 7, from the front end edge toward the rear X2. The ring side external thread 25 can be threadedly engaged with the frame side internal thread 31. The ring side annular outer peripheral surface 26 that has a constant diameter dimension is disposed to the rear X2 of the ring side external thread 25 on the outer peripheral surface of the stop ring 7.

The stop ring 7 is screwed from the front in the frame side internal thread 31 of the filter frame 4 while the ring side external thread 25 is holding the optical filter 2. The stop ring 7 is screwed until a rear end 7a of the stop ring 7 abuts on the annular forward surface 51b of the annular step 51 of the filter frame 4, and fixed coaxially to the filter frame 4. This structure causes the optical filter 2 to be held between the front stopper 21 disposed in the stop ring 7 and the rear stopper 53 disposed in the filter frame 4. Note that the stop ring 7 and the filter frame 4 may be fixed to each other by the adhesive 35.

While the stop ring 7 is fixed to the filter frame 4, the ring side annular outer peripheral surface 26 and the annular inward surface 51a of the annular step 51 abut on each other. The ring side annular inner peripheral surface 24 and the optical filter holding surface 52 form an annular surface without a step. The annular surface formed by the ring side annular inner peripheral surface 24 and the optical filter holding surface 52 has a width dimension W2 larger than the thickness dimension D1 of the optical filter 2. In the present embodiment, the difference between the width dimension W2 of the annular surface formed by the ring side annular inner peripheral surface 24 and the optical filter holding surface 52 and the thickness dimension D1 of the optical filter 2 is 0.03 mm or smaller.

While the optical filter 2 is held between the front stopper 21 and the rear stopper 53, the optical filter 2 is rotatable about the axis L relative to the filter frame 4. Specifically, a clearance of uneven thickness of about 0.01 mm to 0.02 mm is formed between the annular surface formed by the ring side annular inner peripheral surface 24 and the optical filter holding surface 52 and the annular outer peripheral surface 14 of the optical filter 2. When the front filter surface 11 of the optical filter 2 is caused to abut on the front stopper 21, the clearance G2 of 0.03 mm or smaller is formed between the rear filter surface 12 of the optical filter 2 and the rear stopper 53.

(Working Effect)

According to the present embodiment, the optical filter 2 is held by the filter frame (cylindrical body) 4 in a relatively rotatable manner about the axis L. Consequently, the stress (pressure) placed on the optical filter 2 being held by the filter frame 4 is nearly zero.

In the present embodiment, when the optical filter 2 is caused to abut on the front stopper 21, the clearance G2 formed between the rear stopper 53 and the optical filter 2 is 0.05 mm or smaller, which is narrow. Furthermore, in the present embodiment, the rear end 7a of the stop ring 7 in which the front stopper 21 is formed abuts on the annular front end surface 53a of the rear stopper 53, whereby the dimension between the front stopper 21 and the rear stopper 53 is defined accurately. Thus, the optical filter 2 does not rattle between the front stopper 21 and the rear stopper 53.

A structure can also be employed in which the front stopper 21 is provided integrally in the filter frame 4, and the rear stopper 53 is attached to the inner peripheral side of the filter frame 4. In this case, the front stopper 21 is formed to be an annular protrusion that protrudes from the filter frame 4 to the inner peripheral side. Meanwhile, the rear stopper 53 is formed to be a stop ring that is inserted into the filter frame 4 from the rear and fixed to the inner peripheral side of the filter frame 4.

Similarly to the camera filter unit 1A' according to the modification of the second embodiment, the adhesive injection holes (through holes) 47 can be disposed in the filter frame 4 so as to interpose the adhesive 48 between the filter frame 4 and the optical filter 2 through the adhesive injection holes 47, also in the present embodiment. In this manner, rotation of the optical filter 2 about the axis L can be prevented. The position of optical filter 2 can also be determined accurately with the outer peripheral edge of the front filter surface 11 of the optical filter 2 abutting on the annular rear end surface 21a of the front stopper 21, and can be maintained.

Another Embodiment

Figure 10:
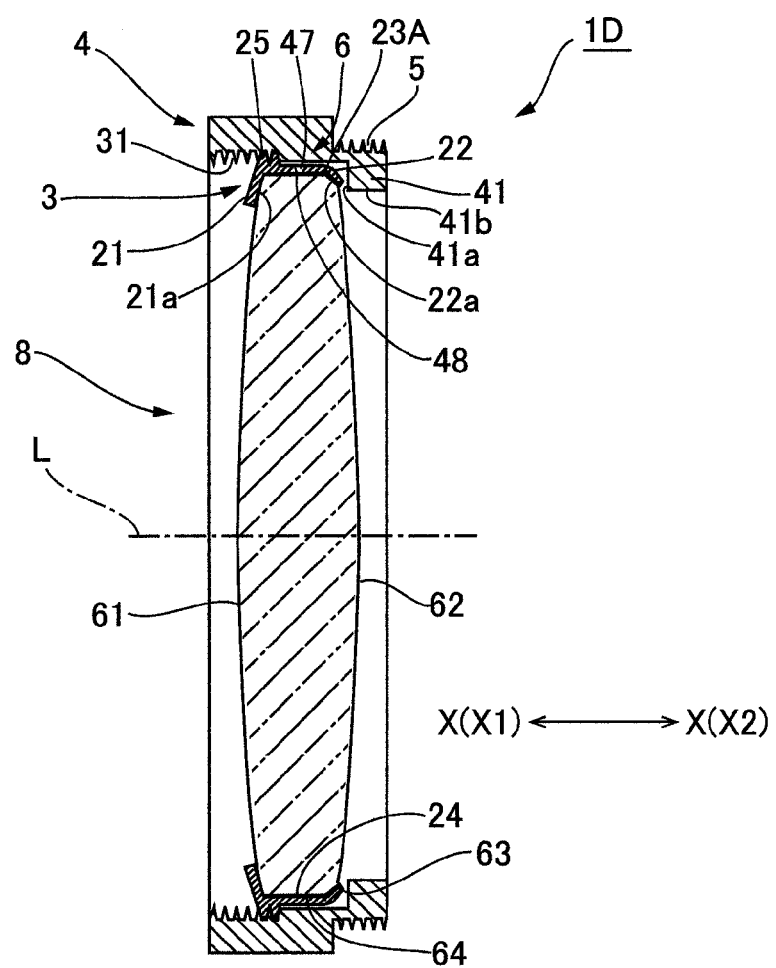
FIG. 10 is a longitudinal sectional view and a partially enlarged sectional view of an imaging lens to which the present invention is applied.

FIG. 10 is a longitudinal sectional view schematically illustrating an imaging lens to which the present invention is applied. An imaging lens 1D is equivalent to the camera filter unit 1A' according to the modification of the second embodiment in which the optical filter 2 is replaced with an optical lens (optical element) 8. Note that the imaging lens 1D includes components similar to those of the camera filter unit 1A' according to the second embodiment, and thus the same reference numerals are given to the corresponding components and description thereof will be omitted.

The optical lens 8 is a convex lens. The optical lens 8 includes a convex front lens surface 61 at the front X1 and a convex rear lens surface 62 at the rear X2. To the outer peripheral edge of the rear lens surface 62, a tapered rear chamfered surface 63 is continuous, inclining to the outer peripheral side toward the front X1. To the front end edge of the rear chamfered surface 63, an annular outer peripheral surface 64 is continuous, with a constant diameter dimension. To the front end edge of the annular outer peripheral surface 64, the front lens surface 61 is continuous.

The front stopper 21 disposed in the filter holding ring 3 inclines to the front X1 toward the inner peripheral side, and the rearward surface 21a of the front stopper 21 is a tapered surface that extends along the outer peripheral edge of the front lens surface 61. The front stopper 21 is abuttable on the optical lens 8 from the front X1 and prevents the optical lens 8 from moving to the front X1. The rear stopper 22 is provided by bending the rear end of the filter holding ring 3 toward the inner peripheral side. The forward surface 22a of the rear stopper 22 extends along the annular chamfered surface 63 of the optical lens 8. The rear stopper 22 is abuttable on the optical lens 8 from the rear X2 and prevents the optical lens 8 from moving to the rear X2. Although the optical lens 8 is held by the filter holding ring 3 in a relatively rotatable manner about the axis L, the optical lens 8 is caused to be unrotatable by the adhesive 48 interposed between the filter holding ring 3 and the optical lens 8. The optical lens 8 is fixed with the front lens surface 61 abutting on the front stopper 21.

A clearance of uneven thickness of about 0.01 mm to 0.02 mm is formed between the annular outer peripheral surface 64 of the optical lens 8 and the ring side annular inner peripheral surface 24 of the filter holding ring 3, also in the present embodiment. When the front lens surface 61 of the optical lens 8 is caused to abut on the front stopper 21, a clearance of 0.05 mm or smaller is formed between the annular chamfered surface 63 of the rear lens surface 62 of the optical lens 8 and the tapered forward surface 22a of the rear stopper 22. Note that the front stopper 21 may be one that has the same shape as the front stopper 21 according to the modification of the second embodiment. Specifically, the front stopper 21 may protrude in the direction orthogonal to the axis L and include an annular rear end surface (rearward surface) orthogonal to the axis L.

In the imaging lens 1D, the stress placed on the optical lens 8 is nearly zero. Consequently, finer images and videos can be obtained when images and videos the resolution of which is many times higher than that of full high-definition ones are shot, for example. The optical lens 8 can be installed in place of the optical filter 2 to form an imaging lens, also in the camera filter units 1, 1A, 1B, and 1C according to the first, second, third, and fourth embodiments, respectively.

The optical member holding structure in which an optical element is disposed coaxially on the inner peripheral side of a cylindrical body and the optical element is held between the front stopper 21 and the rear stopper in a rotatable manner can also be employed when the optical element is installed in imaging equipment or projection equipment. For example, when the optical filter 2 is installed in an optical system of imaging equipment or projection equipment, a configuration corresponding to the camera filter unit 1 according to the first embodiment can be employed. In this case, the filter holding ring 3 holding the optical filter 2 in a relatively rotatable manner is fixed to the equipment. The second rear stopper 53 is installed in the equipment via a distance adjustment mechanism that can adjust the distance to the optical filter 2.

The invention claimed is:

1. An optical element holding structure comprising:
    a cylindrical body into which an optical element is inserted coaxially on an inner peripheral side;
    a frame body which holds the cylindrical body on the inner peripheral side;
    a front stopper, which is disposed on the cylindrical body and is abuttable on an outer peripheral edge of a front surface of the optical element from a front in an axial direction; and
    a rear stopper which is disposed on the frame body and is abuttable on an outer peripheral edge of a rear surface of the optical element from a rear in the axial direction,
    wherein
    the rear end of the cylindrical body abuts on the rear stopper from the front, and
    the cylindrical body and the frame body hold the optical element between the front stopper and the rear stopper in a rotatable manner about an axis, and
    when the optical element is caused to abut on one of the front stopper and the rear stopper, a clearance is formed between the optical element and the other of the front stopper and the rear stopper.

2. The optical element holding structure according to claim 1, wherein the clearance is 0.3 mm or smaller.

3. The optical element holding structure according to claim 1, wherein an adhesive is included that interposes between the cylindrical body and the optical element, and the adhesive fixes the optical element to the cylindrical body in an unrotatable manner.

4. The optical element holding structure according to claim 3, wherein the cylindrical body includes a through hole that penetrates in a direction intersecting the axial direction, and the adhesive enters between the cylindrical body and the optical element through the through hole.

5. A camera filter frame comprising: the optical element holding structure according to claim 1, wherein the camera filter frame holds an optical filter as the optical element.

6. A camera filter unit comprising: the optical element holding structure according to claim 1; and an optical filter held to the inner peripheral side of the cylindrical body.

7. An imaging lens comprising: the optical element holding structure according to claim 1; and an optical lens held to the inner peripheral side of the cylindrical body.

* * * * *